United States Patent
Horváth

(10) Patent No.: US 11,459,021 B2
(45) Date of Patent: Oct. 4, 2022

(54) STEER-BY-WIRE STEERING SYSTEM WITH A FEEDBACK ACTUATOR HAVING REDUNDANT SLEEP-MODE ROTOR POSITION SENSORS

(71) Applicants: thyssenkrupp Presta AG, Eschen (LI); thyssenkrupp AG, Essen (DE)

(72) Inventor: Gergely Horváth, Fülöpszállás (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 168 days.

(21) Appl. No.: 16/645,992

(22) PCT Filed: Oct. 2, 2017

(86) PCT No.: PCT/EP2017/075009
§ 371 (c)(1),
(2) Date: Mar. 10, 2020

(87) PCT Pub. No.: WO2019/068306
PCT Pub. Date: Apr. 11, 2019

(65) Prior Publication Data
US 2020/0277003 A1    Sep. 3, 2020

(51) Int. Cl.
*B62D 5/00* (2006.01)
*B62D 6/00* (2006.01)

(52) U.S. Cl.
CPC ............ *B62D 5/006* (2013.01); *B62D 6/008* (2013.01)

(58) Field of Classification Search
CPC ................................ B62D 5/006; B62D 6/008
See application file for complete search history.

(56) References Cited

U.S. PATENT DOCUMENTS

| | | | |
|---|---|---|---|
| 5,967,253 A | 10/1999 | Collier-Hallman | |
| 2006/0042858 A1* | 3/2006 | Boyle | B62D 5/006 180/402 |
| 2006/0293818 A1 | 12/2006 | Lu | |
| 2007/0046102 A1 | 3/2007 | Reithofer | |

(Continued)

FOREIGN PATENT DOCUMENTS

| | | | |
|---|---|---|---|
| CN | 101549707 A | 10/2009 | |
| CN | 102232031 A | 11/2011 | |

(Continued)

OTHER PUBLICATIONS

International Search Report issued in PCT/EP2017/075009, dated May 23, 2018.

*Primary Examiner* — Jacob D Knutson
(74) *Attorney, Agent, or Firm* — thyssenkrupp North America, LLC

(57) ABSTRACT

A steer-by-wire steering system for a motor vehicle may include a steering wheel and a feedback actuator connected to the steering wheel for providing road feedback to a driver. The feedback actuator may include an electric motor and an electronic control unit. The feedback actuator may further include at least two redundant rotor position sensors. The electronic control unit may be equipped with sleep-mode functionality, which in case an ignition is off awakens the at least two redundant rotor position sensors periodically or upon movement of a rotor of the electric motor to detect and measure rotation of the rotor.

11 Claims, 1 Drawing Sheet

(56) References Cited

U.S. PATENT DOCUMENTS

| | | |
|---|---|---|
| 2011/0098887 A1 | 4/2011 | Fujimoto |
| 2013/0030653 A1 | 1/2013 | Soos |
| 2015/0105980 A1 | 4/2015 | Iwao |
| 2016/0001812 A1 | 1/2016 | Nagae et al. |
| 2018/0127023 A1 | 5/2018 | Füzes et al. |
| 2018/0319419 A1 | 11/2018 | Kreutz |
| 2018/0323738 A1 | 11/2018 | Gémesi |
| 2019/0263445 A1 | 8/2019 | Füzes et al. |

FOREIGN PATENT DOCUMENTS

| | | | |
|---|---|---|---|
| CN | 104302536 A | 1/2015 | |
| CN | 105051553 A | 11/2015 | |
| DE | 19755044 C | 3/1999 | |
| DE | 10103404 A | 8/2002 | |
| DE | 10103404 A1 * | 8/2002 | ............. B62D 5/003 |
| EP | 2309231 A | 4/2011 | |
| JP | H10203397 A | 8/1998 | |
| JP | 2004-256095 A | 9/2004 | |
| JP | 2004314833 A * | 11/2004 | |
| WO | WO-2008016040 A1 * | 2/2008 | ........... B62D 5/0406 |

\* cited by examiner

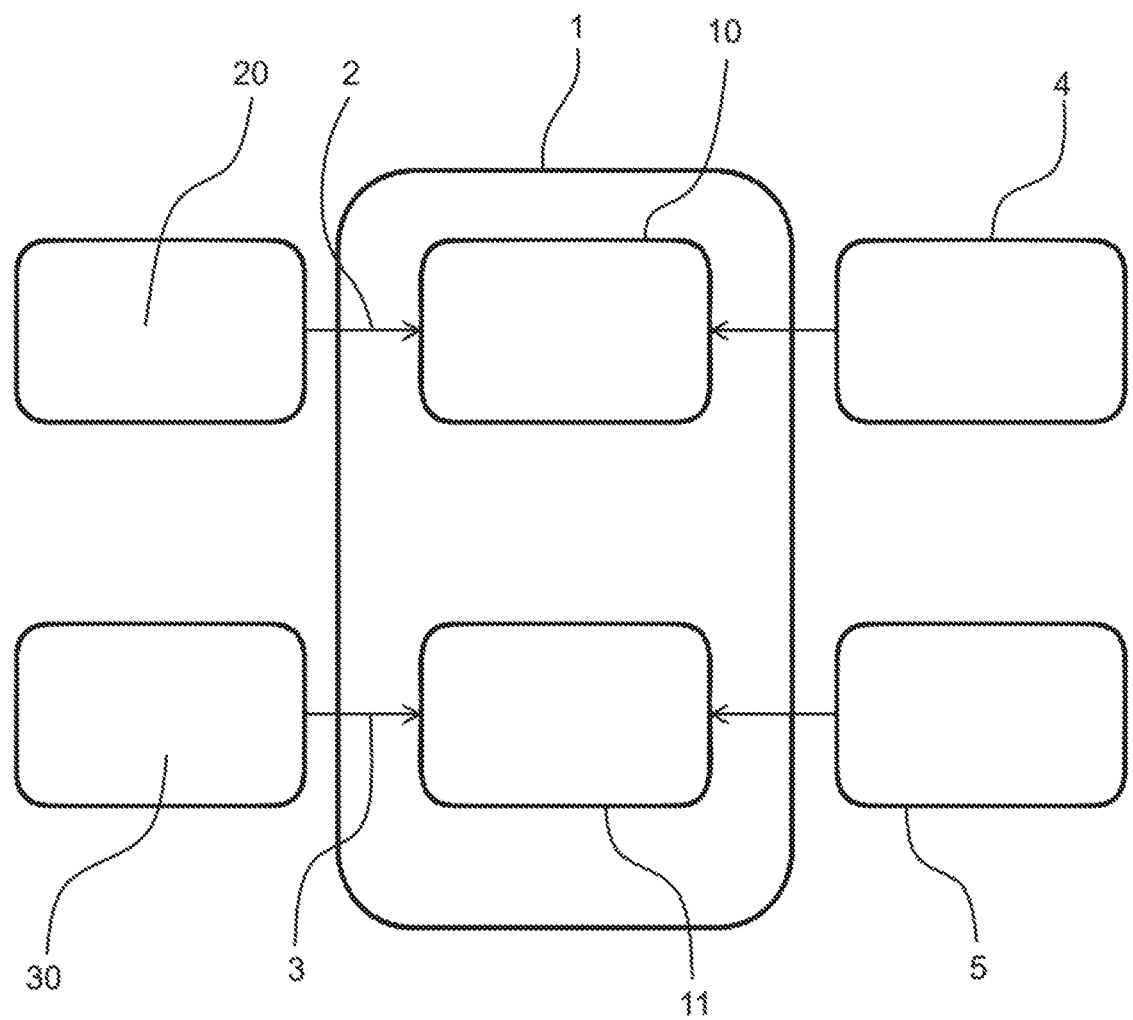

STEER-BY-WIRE STEERING SYSTEM WITH A FEEDBACK ACTUATOR HAVING REDUNDANT SLEEP-MODE ROTOR POSITION SENSORS

CROSS REFERENCE TO RELATED APPLICATION

This application is a U.S. National Stage Entry of International Patent Application Serial Number PCT/EP2017/075009, filed Oct. 2, 2017, the entire content of which are incorporated herein by reference.

FIELD

The present disclosure generally relates to steering systems, including steer-by-wire steering systems for motor vehicles.

BACKGROUND

In a steer-by-wire steering system, the vehicle's steering wheel is disengaged from the steering mechanism. In such a steering system, there is no mechanical coupling between the steering wheel and the steering gear. A steering actuator with an electric motor achieves steering movement. The steering actuator operates in response to detected values of various steering parameters, such as steering wheel angle and vehicle speed etc. The detected values are communicated electronically to the steering actuator from sensors, whereby the electric motor drives the rack and orients the steerable wheels in the desired direction. Even though the mechanical linkage between the steering wheel and the road wheels has been eliminated, a steer-by-wire steering system is expected to produce the same functions and steering feel as a conventional mechanically linked steering system. The forces generated in moving the road wheels have to be fed back to the steering wheel to provide information for directional control to the driver. The feedback also contributes to a feeling of steering referred to as steering feel. In steer-by-wire steering systems the feedback and steering feel respectively is generated with a feedback actuator connected to the steering wheel. The feedback actuator has a steering and angle sensor (SAS), which measures the absolute angle of the steering wheel from end lock position to end lock position. This way the steering system is controlled. In case the SAS is faulty or not present, the feedback actuator does not know the position of the steering wheel and steering is not possible. Thus, the SAS cannot be dispensed.

Thus a need exists for steer-by-wire steering systems for motor vehicles and methods for cost-effectively measuring the position of the steering wheel.

BRIEF DESCRIPTION OF THE FIGURE

The Figure is a schematic view of an example feedback actuator with two separate battery connectors without common ground.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steer-by-wire steering system for a motor vehicle having a steering wheel and a feedback actuator connected to the steering wheel for providing road feedback to a driver, is provided, wherein the feedback actuator comprises an electric motor and an ECU, and wherein the feedback actuator has two redundant rotor position sensors, each part has at least one rotor position sensor, and wherein the ECU is equipped with a sleep-mode functionality, which in case the ignition is off wakes-up the rotor position sensors periodically to detect and measure the rotation of the electric motor's rotor. Waking up function can also be triggered by movement e.g. turn of the steering wheel. This way the position is not lost, if the steering wheel is moved externally e.g. in the workshop. A SAS can be dispensed, because the rotor angle can be measured redundantly with the rotor position sensors.

Preferably, the feedback actuator has two battery connectors without common ground. In that regard, it is advantageous if the feedback actuator has a first part and a second part connected via the two battery connectors to a first battery and a second battery, respectively. In case one of the batteries is disconnected from the system's electronic control unit, the other part of the feedback actuator connected to the other battery can take over control and the rotor position is not lost.

Preferably, the first part of the feedback actuator is connected to a first rotor position sensor of the two redundant rotor position sensors and the second part of the feedback actuator is connected to the second rotor position sensor likewise forming to independent working systems.

It is advantageous, if the functions of the first part and the second part of the feedback actuator are identical.

Further, a method for detecting movement of a steering wheel in a steer-by-wire steering system for a motor vehicle is provided, the steer-by-wire steering system having a steering wheel and a feedback actuator connected to the steering wheel for providing road feedback to a driver, wherein the feedback actuator comprises an electric motor and an ECU, and wherein the feedback actuator is calibrated during assembly of the steer-by-wire steering system by measurement of the two end lock positions of the steering wheel, and wherein the feedback actuator has two redundant rotor position sensors, and the method further comprises the following steps:

If the ignition is off,
waking-up the rotor position sensors periodically to detect and measure the rotation of the electric motor's rotor by a sleep-mode functionality of the ECU or;
waking-up the rotor position sensors by the movement of the rotor to detect and measure the rotation of the electric motor's rotor by a sleep-mode functionality of the ECU;
Storing the measured position of the electric motor's rotor in a storage means;

With ignition on, reading out the stored position of the electric motor's rotor and measurement of the current position of the electric motor's rotor;

Crosschecking the current position of the electric motor's rotor by reading out both rotor position sensors.

With this method the feedback actuator always knows the position of the steering wheel even if the steering wheel is turned externally while the ignition is off. An SAS can be dispensed.

Preferably, the feedback actuator has two battery connectors without common ground. In that regard, it is advantageous if the feedback actuator has a first part and a second part connected via the two battery connectors to a first battery and a second battery, respectively. In case one of the batteries is disconnected from the system's electronic control unit, the other part of the feedback actuator connected to the other battery can take over control and the rotor position is not lost.

Preferably, the first part of the feedback actuator is connected to a first rotor position sensor of the two redundant rotor position sensors and the second part of the feedback actuator is connected to the second rotor position sensor likewise forming to independent working systems.

It is advantageous, if the first part and the second part of the feedback actuator are identical.

Further it is preferred, that the method includes the following step: In case one of the batteries is disconnected from the system's ECU, taking over control by the other part of the feedback actuator connected to the other battery.

The Figure shows a schematic illustration of a feedback actuator 1 with two separate battery connectors 2,3 without common ground. A first part of the feedback actuator 10 is connected to a first battery 20 and a second part of the feedback actuator 11 is connected to a second battery 30 likewise. The functions of the two parts of the feedback actuator 10,11 are identical. The feedback actuator 1 is connected to a steering wheel in order to generate a steering feel (not shown). A steering shaft connected to the steering wheel is driven by the feedback actuator having an electric motor, which is connected to the steering shaft via a reduction gear. An electronic control unit (ECU) controlling the electric motor forms part of the feedback actuator 1. The feedback actuator 1 further has two independently working rotor position sensors 4,5. A first rotor position sensor 4 of those redundant sensors 4,5 is connected to the first part of the feedback actuator 10 and the second rotor position sensor 5 is connected to the second part of the feedback actuator 11, respectively. During the assembly of the steering system the feedback actuator 1 is calibrated by measurement of the two end lock positions of the steering wheel. After this scenario, the feedback actuator knows the current position of steering wheel any time. The feedback actuator is equipped with a dual sleep-mode; The ECU checks the rotor position sensors' values periodically to detect and measure the rotation of the electric motor's rotor (e.g 10 ms). This dual sleep-mode allows measuring the rotation of the steering wheel after the ignition is off. This can be necessary e.g. in workshop. If one of the batteries is disconnected from the system's electronic control unit (ECU), the rotor position is not lost, because the other part of the feedback actuator connected to the second battery takes over. The dual sleep-mode allows to crosscheck the rotor position sensors after the ignition on cycle. A steering and angle sensor is not needed to measure the absolute angle, which reduces the prize and the size of the feedback actuator, because an extra connection is not needed. In the case a SAS is present but faulty, the above described setup can be used to determine the steering wheel angle.

What is claimed is:

1. A steer-by-wire steering system for a motor vehicle, the steer-by-wire steering system comprising:
    a steering wheel; and
    a feedback actuator connected to the steering wheel for providing road feedback to a driver, wherein the feedback actuator comprises:
        an electric motor with a rotor,
        an electronic control unit equipped with sleep-mode functionality, and
        at least two redundant rotor position sensors, wherein in case an ignition is off the sleep-mode functionality of the electronic control unit is configured to awaken the at least two redundant rotor position sensors, periodically or upon movement of the rotor, to detect and measure rotation of the rotor.

2. The steer-by-wire steering system of claim 1 wherein the feedback actuator includes two battery connectors without common ground.

3. The steer-by-wire steering system of claim 2 wherein the feedback actuator includes a first part and a second part connected via the two battery connectors to a first battery and a second battery, respectively.

4. The steer-by-wire steering system of claim 3 wherein the first part is connected to a first rotor position sensor of the at least two redundant rotor position sensors, wherein the second part is connected to a second rotor position sensor of the at least two redundant rotor position sensors.

5. The steer-by-wire steering system of claim 3 wherein functions of the first and second parts are identical.

6. A method for detecting movement of a steering wheel in a steer-by-wire steering system for a motor vehicle, the steer-by-wire steering system comprising a steering wheel and a feedback actuator connected to the steering wheel for providing road feedback to a driver, wherein the feedback actuator comprises an electric motor and an electronic control unit, wherein the feedback actuator is calibrated during assembly of the steer-by-wire steering system by measurement of two end lock positions of the steering wheel, wherein the feedback actuator includes at least two redundant rotor position sensors, wherein with an ignition off the method comprises:
    awakening the at least two redundant rotor position sensors, periodically or based on movement of a rotor of the electric motor, to detect and measure rotation of the rotor with sleep-mode functionality of the electronic control unit; and
    storing a measured position of the rotor in a storage means,
wherein with the ignition on the method comprises:
    reading out a stored position of the rotor and measuring a current position of the rotor; and
    cross-checking the current position of the rotor by reading out the at least two redundant rotor position sensors.

7. The method of claim 6 wherein the feedback actuator includes two battery connectors without common ground.

8. The method of claim 7 wherein the feedback actuator includes a first part and a second part connected via the two battery connectors to a first battery and a second battery, respectively.

9. The method of claim 8 wherein the first part is connected to a first rotor position sensor of the at least two redundant rotor position sensors, wherein the second part is connected to a second rotor position sensor of the at least two redundant rotor position sensors.

10. The method of claim 8 wherein the first and second parts are identical.

11. The method of claim 8 wherein upon disconnection of the first battery from the electronic control unit, the method comprises taking over control by the second part of the feedback actuator connected to the second battery.

* * * * *